United States Patent Office 3,482,959
Patented Dec. 9, 1969

3,482,959
METHOD OF INCREASING SUGAR YIELD OF SUGARCANE BY TREATMENT WITH CERTAIN ENDOTHAL COMPOUNDS, AND COMPOSITIONS USEFUL THEREIN
Louis G. Nickell and Tyrus Tanimoto, Honolulu, Hawaii, assignors to Hawaiian Sugar Planters' Association, Honolulu, Hawaii, a voluntary, nonprofit agricultural organization
No Drawing. Filed Mar. 6, 1967, Ser. No. 620,630
Int. Cl. A01n 5/00
U.S. Cl. 71—88         10 Claims

ABSTRACT OF THE DISCLOSURE

Treatment of growing parts of sugarcane prior to harvest with endothal (3,6-endoxohexahydrophthalic acid) or with certain derivatives thereof such as the amine salts, and particularly with the dimethyl tertiary amine salts of endothal, desirably increases the sucrose yield of sugarcane by increasing the sucrose content of the cane stalk and/or by reducing the relative proportion of nonsucrose components.

Background of invention

A great deal of work has been done in the past on increasing the yield of sugar which can be recovered from sugarcane. Considerable progress has been made in this connection by improvement of the varieties of sugarcane being planted, by enrichment of the soil with fertilizer and by irrigation where the climate did not naturally provide sufficient moisture for optimum plant growth. More recent efforts in improving sugar production have increasingly turned toward the use of chemicals in modifying and controlling physiological processes of sugarcane, particularly its ripening prior to harvest. The disclosures of U.S. Patents 3,224,865; 3,245,775 and 3,291,592 are representative of such more recent efforts and indicate that heretofore certain chlorinated derivatives of benzoic acid and heterocyclic compounds of the uracil type, and again particularly certain halogenated derivative of uracil, have shown some promise. There has been some concern, however, about the resistance of these previously suggested compounds to breakdown in the plant and about their persistence in the soil. While some compounds of this general type have heretofore been approved for use in herbicides under circumstances where direct application to an edible crop is kept at a minimum, their deliberate application to an edible crop such as sugarcane raises quite different toxicological questions which are not likely to be conclusively settled for a long time to come.

Extensive efforts therefore continue to be made in searching for effective but less controversial chemical agents for controlling the ripening of sugarcane so as to increase the sucrose yield therefrom. Broadly speaking, chemicals selected for evaluation in this type of work have been generally of a type which has been previously found active in work with other plants as a plant hormone, herbicide, inhibitor of growth of terminal buds, active in killing the spindle of cane upon topical microapplication, etc. It can be categorically stated, however, that among the compounds previously known to be useful for such other special purposes only a few have been found effective in controlling the ripening of sugarcane in the desirable manner. Moreover, no relationship has been recognized to date between the chemical structure of such compounds and (a) their phytotoxic effects, (b) their physiological effects on the morphogenetic development of the plant, and (c) their activity in having positive effects on ripening. In other words, the effectiveness of a compound or class of compounds in controlling the ripening of sugarcane and thereby increasing sugar yield remains essentially unpredictable except that if one particular compound is found to have good activity for this purpose compounds which are chemically closely related to it also can be expected to possess similar activity.

It is therefore an object of this invention to provide new agents for controlling the ripening of sugar cane. A more specific object is to increase the sucrose yield of sugar cane by chemically treating it during its final ripening stages prior to harvest without introducing any substantial toxicological hazards. Still more specifically it is an object of this invention to increase the sucrose yield of sugar cane by treating it prior to harvest with a chemical agent which has a relatively low degree of persistence and is susceptible to autodecomposition or to decomposition by soil bacteria. On the other hand, the ripening chemical must be sufficiently stable to provide the desired effect for several weeks in order to give operational flexibility. Compounds which have the effect of only temporary increasing the sucrose content within two to three weeks after application followed by a substantial decrease, sometimes to below that of untreated controls, are obviously not desirable.

Summary of invention

It has now been discovered that excellent results in increasing the sucrose yield of sugar cane can be obtained by treating sugarcane during its ripening stage prior to harvest with endothal (3,6-endoxohexahydrophthalic acid) or with amine salts thereof or most preferably with the dimethyl tertiary amine salts thereof. Endothal corresponds to the following formula

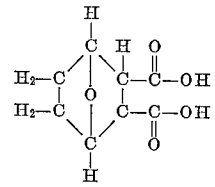

Its useful amine salts can be obtained by reacting one mole of the free acid with one or two moles of a primary, secondary or tertiary amine of the formula

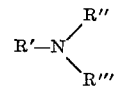

wherein R' is an alkyl group of from 1 to 20 carbon atoms and R'' and R''' are the same or different and are selected from the group consisting of hydrogen and alkyl radicals of from 1 to 20 carbon atoms. Mixtures of such amines may also be used in preparing the active mono or disalts, or two different amines may be used in sequence to make disalts wherein each carboxyl group of the endothal molecule is combined with a different amine.

Particularly preferred are the mono and the disalts of endothal wherein the amine is a tertiary amine containing two $C_1$ to $C_3$ alkyl groups, especially methyl groups, and one higher alkyl group such as octyl, lauryl or octadecyl.

Accordingly, the preferred compounds include the mono (N,N-dimethyl-octylamine) salt of endothal and the corresponding monosalts wherein the amine is N,N-dimethyl - nonylamine, N,N - dimethyl - dodecylamine, N,N - dimethyl - tridecylamine, N,N-dimethyl-hexadecylamine, N,N - dimethyl - octadecylamine, N,N - dimethyl-docosylamine, or an alkylamine derived from natural products such as N,N-dimethyl-cocoamine, N,N-dimethyl-soybean-amine, and N,N-dimethyl tallow amine. The corresponding disalts of endothal such as the di(N,N-dimethyl-higher alkylamine) salts wherein the higher alkyl group contains from 8 to 20 carbon atoms, e.g., the di(N,N - dimethylhexadecylamine) and the di(N,N - dimethyl-cocoamine) salts of endothal, are similarly useful. Other highly effective salts can be derived from N,N-diethyl-higher alkylamines such as N,N-diethyl-laurylamine or from N,N-dipropyl-higher alkylamines, such as N,N-diisopropyloctadecylamine. Salts obtained by reacting endothal with a mixture of amines, e.g., a disalt obtained by combining one mole of endothal with one mole of N,N-dimethyl-cocoamine and one mole of tridecylamine are also effective. Among available endothal salts are the disalt of N,N-dimethyl-hexadecylamine; the disalt of N,N-dimethyl-cocoamine; and the mixed amine disalt of N,N-dimethylcocoamine and tridecylamine.

Other active compounds which are useful for the present purpose include the endothal mono- and disalts of secondary amines such as N-methyl-octylamine, N-methyl-cocoamine, N-ethyl-laurylamine and so forth.

The alkyl esters of endothal which have been tested have been found relatively ineffective but the mercaptoethyl esters such as mono-(2-ethylmercaptoethyl) ester of endothal have been found to increase the sucrose yield. In surprising contrast to the amine salts, the inorganic salts of endothal have been found to be inactive, as in the case of the copper or potassium salts, and the diammonium salt has actually been found to have a net depressing effect on the sucrose content. Still other salts such as the diethyl hydroxyl amine disalt of endothal has likewise been found inactive.

The active compounds described above can be used individually or as a mutual mixture of two or more of such compounds. They are conveniently applied to sugarcane in the field in the form of an aqueous solution or suspension which, for instance, can be sprayed from airplanes. In preparing such a solution, one or a combination of various known surface active agents variously known as wetting agents, detergents or emulsifying agents can be used as is otherwise well known in the art. For instance, suitable surface active agents are described in U.S. Patent 3,224,865, column 2, lines 61–66 and in U.S. Patent 3,245,775, column 2, lines 57–64. The preferred surfactants for use in the composition of the present invention are those of the non-ionic type, e.g., alkyl phenoxy poly(ethyleneoxy)ethanols such as nonyl phenol adducts with ethyleneoxide; trimethyl nonyl polyethylene glycol ethers, polyethylene oxide adducts of fatty and resin acids, and long chain alkyl mercaptan adducts with ethylene oxide.

In accordance with this invention, the treatment of the sugarcane crop can be carried out in the period from between two weeks to two months before harvesting, with the preferabe time being that period between three weeks and eight weeks prior to harvest. The rate of application of the active endothal compound (calculated in terms of the free acid when derivatives thereof are used) is desirably in the range of from one to four pounds per acre, though higher rates (e.g., up to 10 pounds or more per acre) or rates lower than one pound per acre can also be effective. The optimum amount will vary somewhat depending on the environmental conditions, time of year, and age and variety of cane being treated, but can be readily determined for each particular case by preliminary testing. With the particular type of aerial spray apparatus used in this work, it has been found particularly convenient to apply these agents to the sugarcane field in the form of aqueous solutions, suspensions or emulsions having a concentration such that application at the rate of from seven to ten gallons per acre will provide the required dosage of active chemical. However, lower or higher gallonages may be found more convenient with different equipment.

The preferred carrier for these active compounds is water containing about 0.1 to 2% by weight of surface active agent. However, instead of using water as the carrier, nonphytotoxic mineral oils either as such or in the form of water-in-oil or oil-in-water emulsions may be used similarly as is otherwise well known in the art of treating vegetation with beneficial growth control agents.

Although many endothal amines have been tested and found to be useful, nevertheless, it should be understood that there are quite substantial differences in the activity found in the use of the various amines. For instance, a number of amine and other salts of endothal, and also endothal acid itself, were sprayed separately in formulated solutions at the concentration of 4 pounds per acre in 7 gallons of aqueous solution per acre on field cane apprximately 2 weeks and 4 weeks before harvest. At harvest the top 15 joints of cane were cut off and comparisons made with similar samples from untreated cane. The analyses were made and the effects on juice purity and pol percent cane are given in Table I below. The values used represent change from the untreated material.

TABLE I.—EFFECT OF ENDOTHAL COMPOUNDS ON RIPENING

| Test No.: | Compound | Applied 2 weeks before harvest | | Applied 4 weeks before harvest | |
|---|---|---|---|---|---|
| | | Juice purity, percent | Pol percent cane | Juice purity, percent | Pol percent cane |
| 1 | Endothal acid | +1.39 | +0.95 | +2.25 | +1.72 |
| 2 | Mono(N,N-dimethylcocoamine)salt | +6.82 | +1.73 | +9.83 | +3.14 |
| 3 | Mono(N,N-dimethyltridecylamine)salt | +4.47 | +0.99 | +10.48 | +2.48 |
| 4 | Mono(N-methyltridecylamine)salt | +0.65 | +0.30 | +5.31 | +1.26 |
| 5 | Di(N,N-dimethylcocoamine)salt | +4.46 | +1.09 | +9.59 | +2.71 |
| 6 | Di(N,N-dimethylhexadecylamine)salt | +11.61 | +1.23 | +4.75 | +1.28 |
| 7 | Mono(2-ethylmercaptoethyl)ester | +2.26 | +1.02 | +7.25 | +1.73 |
| 8 | Diethylhydroxylamine disalt | −5.07 | −0.78 | −1.78 | −0.60 |
| 9 | Monoethylester | +3.81 | +0.52 | +4.35 | +0.14 |
| 10 | Dipotassium salt | +2.65 | +0.36 | −0.35 | −0.36 |
| 11 | Copper salt | +0.03 | +0.08 | +0.15 | −0.16 |
| 12 | Diammonium salt | −0.78 | +0.09 | −6.88 | −1.54 |

Analyses as used in these investigations are carried out by the so-called "press method" developed in Hawaii by T. Tanimoto, Hawaiian Planters' Record, Volume 57, page 133, 1964. The data are expressed as Juice Purity and Pol Percent Cane. Pol Percent Cane is a polarimetric determination and will equal the percentage of sucrose if it is the only substance in the solution which will rotate the plane of polarized light. In any event, a determination of Pol Percent Cane is a standard method in many sugar producing areas as an effective means of determining the sucrose content of sugar cane juice.

As can be seen, the compounds used in Tests 1 through 7 produce a distinctly beneficial effect whereas the compounds used in the other five tests produce either an essentially indifferent effect or a clearly deleterious one.

A comparison between Tests 3 and 4 shows that the tertiary amine salt is faster acting and more potent than the secondary amine salt.

The following examples further illustrate particularly effective modes of carrying out the present invention.

Example 1

Four pounds of the mono(N,N-dimethyltridecylamine) salt of endothal is disolved in 7 gallons of water to which is added 0.25% (w./w.) of a surface active agent, Tergitol NPX (nonyl phenyl polyethylene glycol ether condensed with ethylene oxide). This solution is applied to field grown cane about 4 weeks before harvest at the rate of about 4 pounds of the endothal salt per acre.

As indicated in Table I, Test 3, this treatment causes an increase in the sucrose content of the younger nodes of the treated stalks. It also increases the purity of the expressed juice from these stalks. The net effect of this treatment is to increase substantially the yield of sucrose when the cane is harvested about 4 weeks after application.

Example 2

Same as in Example 1 substituting di(N,N-dimethylcocoamine) salt of endothal as the active compound and 0.3% Tergitol XD (polyalkylene glycol ether) as the surface active agent. The substantial increase in sucrose yield resulting from this treatment is reflected in Table I, Test 5.

Example 3

Same as Example 1 substituting mono(N,N-dimethylcocoamine) salt of endothal as the active compound and 1% "Carbowax" polyethylene glycol as the surface active agent. The effectiveness of this treatment is reflected in Table I, Test 2.

The nature and effectiveness of the present invention should be apparent from the foregoing detailed description and illustrative examples. However, it should be understood that these examples are not intended to be limiting and that the true scope of the invention is to be determined from the appended claims.

What is claimed is:

1. A method for modifying the ripening of field grown sugarcane so as to increase its yield of sucrose which comprises applying to the cane at a time at least about two weeks prior to harvest a compound selected from the class consisting of 3,6-endoxohexahydrophthalic acid, monoamino and diamino salts thereof wherein the amine is one corresponding to the formula

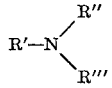

wherein R' is an alkyl group of from 1 to 20 carbon atoms and R" and R'" are the same or different and are selected from the group consisting of hydrogen and alkyl radicals of from 1 to 20 carbon atoms, and mixtures thereof at a rate corresponding to from 1 to 10 pounds of compound per acre.

2. A method according to claim 1 wherein the active compound is a dimethyl tertiary amine containing an alkyl group of from 8 to 20 carbon atoms.

3. A method according to claim 1 wherein the active compound is the mono(N,N-dimethyltridecylamine) salt.

4. A method according to claim 1 wherein the active compound is the N,N-dimethylcocoamine-tridecylamine salt.

5. A method according to claim 1 wherein the active compound is the di(N,N-dimethylcocoamine) salt.

6. A method for improving the ripening of sugarcane so as to increase its yield of sucrose which comprises applying mono(2-ethylmercaptoethyl) ester of 3,6-endoxohexahydrophthalic acid to the cane at a time from about two weeks to two months prior to harvest.

7. A method according to claim 1 wherein the active compound is applied to the cane in admixture with water as the carrier.

8. A method according to claim 7 wherein the water solution or suspension is sprayed on the cane at the rate of 5 to 10 gallons per acre.

9. A method according to claim 7 wherein the water mixture contains between 0.1 and 2% by weight of a surface active agent.

10. A method according to claim 9 wherein the surfactant is a non-ionic surface active agent.

References Cited

UNITED STATES PATENTS

| | | | |
|---|---|---|---|
| 2,576,080 | 11/1951 | Tischler | 71—88 X |
| 3,178,277 | 4/1965 | Reck et al. | 71—88 |
| 3,246,015 | 4/1966 | Lindaberry et al. | 71—66 X |

OTHER REFERENCES

Nickell et al., Haw. Sugar Technol., 24th Annual Conference, November 1965, pp. 152 to 163 (pp. 152, 155, 156, 160 and 163 particularly relied upon).

JAMES O. THOMAS, JR., Primary Examiner